US012480641B1

(12) United States Patent
Mueller

(10) Patent No.: US 12,480,641 B1
(45) Date of Patent: Nov. 25, 2025

(54) METHODS AND APPARATUS FOR TOOL-LESS EXTERIOR LED LIGHTING FIXTURES

(71) Applicant: Reto Mueller, Tampa, FL (US)

(72) Inventor: Reto Mueller, Tampa, FL (US)

( * ) Notice: Subject to any disclaimer, the term of this patent is extended or adjusted under 35 U.S.C. 154(b) by 0 days.

(21) Appl. No.: 18/902,355

(22) Filed: Sep. 30, 2024

Related U.S. Application Data

(60) Provisional application No. 63/542,389, filed on Oct. 4, 2023.

(51) Int. Cl.

| | |
|---|---|
| ***F21V 19/00*** | (2006.01) |
| ***F21S 9/03*** | (2006.01) |
| ***F21V 17/16*** | (2006.01) |
| ***F21V 21/30*** | (2006.01) |
| ***F21V 23/06*** | (2006.01) |
| ***F21V 29/70*** | (2015.01) |
| ***F21V 31/00*** | (2006.01) |

(52) U.S. Cl.
CPC ............ *F21V 19/004* (2013.01); *F21S 9/032* (2013.01); *F21V 17/162* (2013.01); *F21V 21/30* (2013.01); *F21V 23/06* (2013.01); *F21V 29/70* (2015.01); *F21V 31/005* (2013.01)

(58) Field of Classification Search
CPC .......... F21S 9/032; F21V 19/003–0055; F21V 21/0824; F21V 21/30; F21V 23/06; F21V 29/70–713; F21V 31/00–005
See application file for complete search history.

(56) References Cited

U.S. PATENT DOCUMENTS

| | | | | |
|---|---|---|---|---|
| 8,033,687 | B2 | 10/2011 | Wang | |
| 8,222,820 | B2 | 7/2012 | Wang | |
| 8,240,887 | B2 | 8/2012 | Daily | |
| 8,414,163 | B2 | 4/2013 | Hashimoto | |
| 8,684,569 | B2 | 4/2014 | Pickard | |
| 8,702,274 | B2 | 4/2014 | Breidenassel | |
| 8,770,806 | B2 | 7/2014 | Koo | |
| 8,801,217 | B2 | 8/2014 | Oehle | |
| 8,899,795 | B2 | 12/2014 | Tanaka | |
| 9,249,958 | B2 * | 2/2016 | Schmuckle | F21K 9/20 |
| 9,303,848 | B2 | 4/2016 | Lin | |

(Continued)

*Primary Examiner* — Jason M Han
(74) *Attorney, Agent, or Firm* — QuickPatents; Kevin Prince

(57) ABSTRACT

A lighting fixture for supporting on various surfaces combines the performance of integrated LED systems with the ease of use of non-integrated systems. The fixture comprises a housing with a removable shroud, enclosing a PCB assembly with an integrated LED driver and light source. An attachment mechanism secures the shroud to the housing, compressing internal components for heat dissipation and water resistance. The design includes an optic, lens, and compression elements for optimal light output and component alignment. A rotational leg assembly allows for adjustable positioning. Power can be supplied via a low voltage transformer, rechargeable battery, or the like. The fixture's innovative design allows for tool-less assembly and disassembly, enabling easy maintenance and replacement of components while maintaining high performance standards. This approach overcomes limitations of traditional LED lighting systems, offering a practical solution for various exterior lighting applications.

17 Claims, 3 Drawing Sheets

(56) References Cited

U.S. PATENT DOCUMENTS

| | | | |
|---|---|---|---|
| 9,810,417 | B2 | 11/2017 | Wronski |
| 10,448,503 | B1 | 10/2019 | Emerson |
| 10,996,543 | B2 | 5/2021 | Tolan |
| 11,359,779 | B1 | 6/2022 | Hsu |
| 2012/0236563 | A1 | 9/2012 | Breidenassel |
| 2013/0208477 | A1 | 8/2013 | Wang |
| 2014/0218933 | A1 | 8/2014 | Feng |
| 2014/0301089 | A1 | 10/2014 | Stucchi |
| 2016/0215967 | A1 | 7/2016 | Chad |

* cited by examiner

METHODS AND APPARATUS FOR TOOL-LESS EXTERIOR LED LIGHTING FIXTURES

CROSS REFERENCE TO RELATED APPLICATIONS

This application claims the benefit of U.S. Provisional Patent Application 63/542,389, filed on Oct. 4, 2023, and incorporated herein by reference.

STATEMENT REGARDING FEDERALLY SPONSORED RESEARCH AND DEVELOPMENT

Not Applicable.

FIELD OF THE INVENTION

This invention relates to lighting fixtures, and more particularly to a tool-loess exterior LED lighting fixture.

BACKGROUND

Exterior LED lighting fixtures have traditionally been categorized into two main types: integrated and non-integrated systems. Integrated LED lighting systems typically consist of separate PCBs for the driver and LED, which are affixed to a housing engineered to meet the specific needs of these components. These systems offer high performance, including superior illumination output, color saturation, and lifespan, due to the use of heavy-duty electrical components and effective heat dissipation throughout the entire lighting fixture housing. However, integrated systems often require tools and technical expertise for maintenance or replacement of components.

On the other hand, non-integrated LED lighting systems combine the driver and LED into a self-contained module, often referred to as a lamp or bulb. These systems are generally easier to replace or interchange without tools. However, they typically suffer from lower illumination output, lower color saturation, and shorter lifespans. This is primarily due to the use of light-duty electrical components and the necessity to stack PCBs within a confined space. Additionally, heat dissipation in non-integrated systems is less efficient, as it primarily occurs through the lamp's own enclosing shell, which is then contained within another sealed housing.

The drawbacks of existing exterior LED lighting fixtures highlight a need in the industry for a solution that combines the benefits of both integrated and non-integrated systems. An ideal invention would offer the high performance, durability, and effective heat dissipation of integrated systems, while maintaining the ease of use and tool-less interchangeability of non-integrated systems. Such an invention would address the limitations of current designs by providing a lighting fixture that is both high-performing and user-friendly, allowing for easy maintenance and replacement of components without sacrificing quality or longevity. This would be particularly beneficial for applications where frequent maintenance is required or where users may not have access to specialized tools or technical expertise. The present invention accomplishes these objectives.

SUMMARY OF THE INVENTION

A lighting fixture for supporting on various surfaces comprises a housing with a top end and a lower end, defining an internal volume therein. A housing shroud mates with the top end of the housing. An attachment mechanism secures the housing shroud to the housing, which may include rotation channels and corresponding rotation ramps, screw threads, clamps, or the like.

Inside the housing, a PCB assembly with an integrated LED driver and light source is positioned. Power connectors fixed to the PCB assembly and housing provide electrical power from a power source. An optic and lens are positioned above the PCB assembly within the internal volume.

Compression elements compress the components within the housing when the shroud is secured, ensuring contact for heat dissipation and water resistance. A thermal pad may be positioned between the PCB assembly and the housing.

The optic includes spacers for fixing its distance from the LED light source, with prongs that mate with apertures in the PCB assembly. The lens fits within the housing shroud and is fixed between compression elements and a housing body compression surface.

The housing may include a rotational leg assembly at the lower end, which can terminate in a spike for insertion into the ground or be designed for mounting on a surface or mounting bracket. This assembly may include an adjustment mechanism for changing the angle of light emission.

Power can be supplied by a low voltage transformer or similar, or a rechargeable battery, potentially charged by at least one solar cell. The fixture combines the performance of integrated LED systems with the ease of use of non-integrated systems, allowing for tool-less interchangeability and replaceability of components.

Assembly involves stacking components within the housing, securing them with compression elements, and attaching the housing shroud. The design allows for easy disassembly and replacement of parts without tools.

The present invention combines the advantages of both integrated and non-integrated LED lighting systems. By integrating the driver and LED into a single PCB assembly within a specially designed housing, the invention achieves the high performance, durability, and effective heat dissipation characteristic of integrated systems.

Simultaneously, it maintains the ease of use and tool-less interchangeability associated with non-integrated systems. This novel approach results in a lighting fixture that offers superior illumination output, color saturation, and lifespan, while allowing for simple maintenance and replacement of components without the need for specialized tools or technical expertise. The invention thus overcomes the drawbacks of existing exterior LED lighting fixtures, providing a high-performing, user-friendly solution that is suitable for a wide range of applications, from residential to commercial settings. This innovative design not only solves the problems inherent in prior art but also sets a new standard for exterior LED lighting fixtures, combining performance with practicality in a way previously unachieved in the industry. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
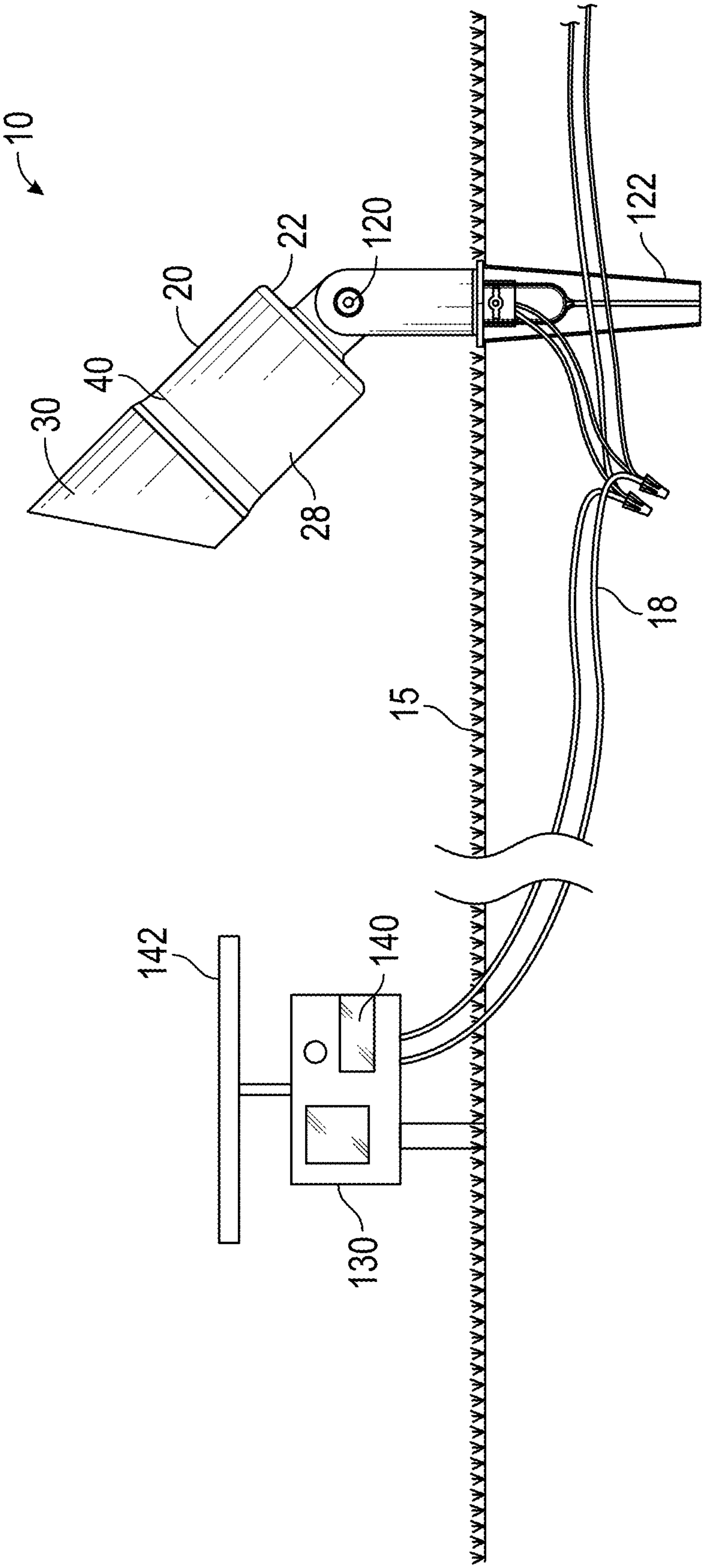
FIG. 1 is a perspective view of a lighting fixture for supporting on a surface.
Figure 2:
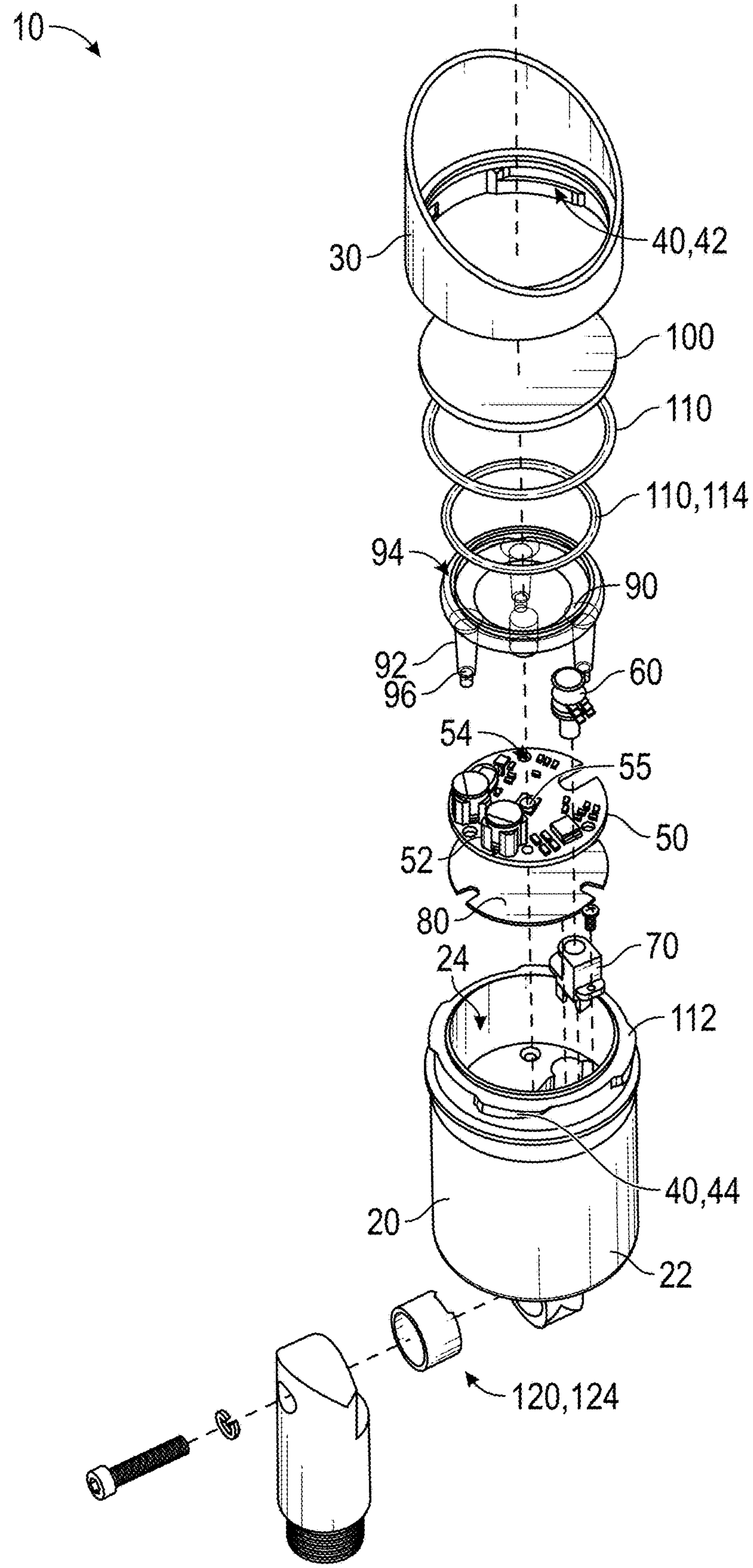
FIG. 2 is an exploded perspective view thereof.
Figure 3:
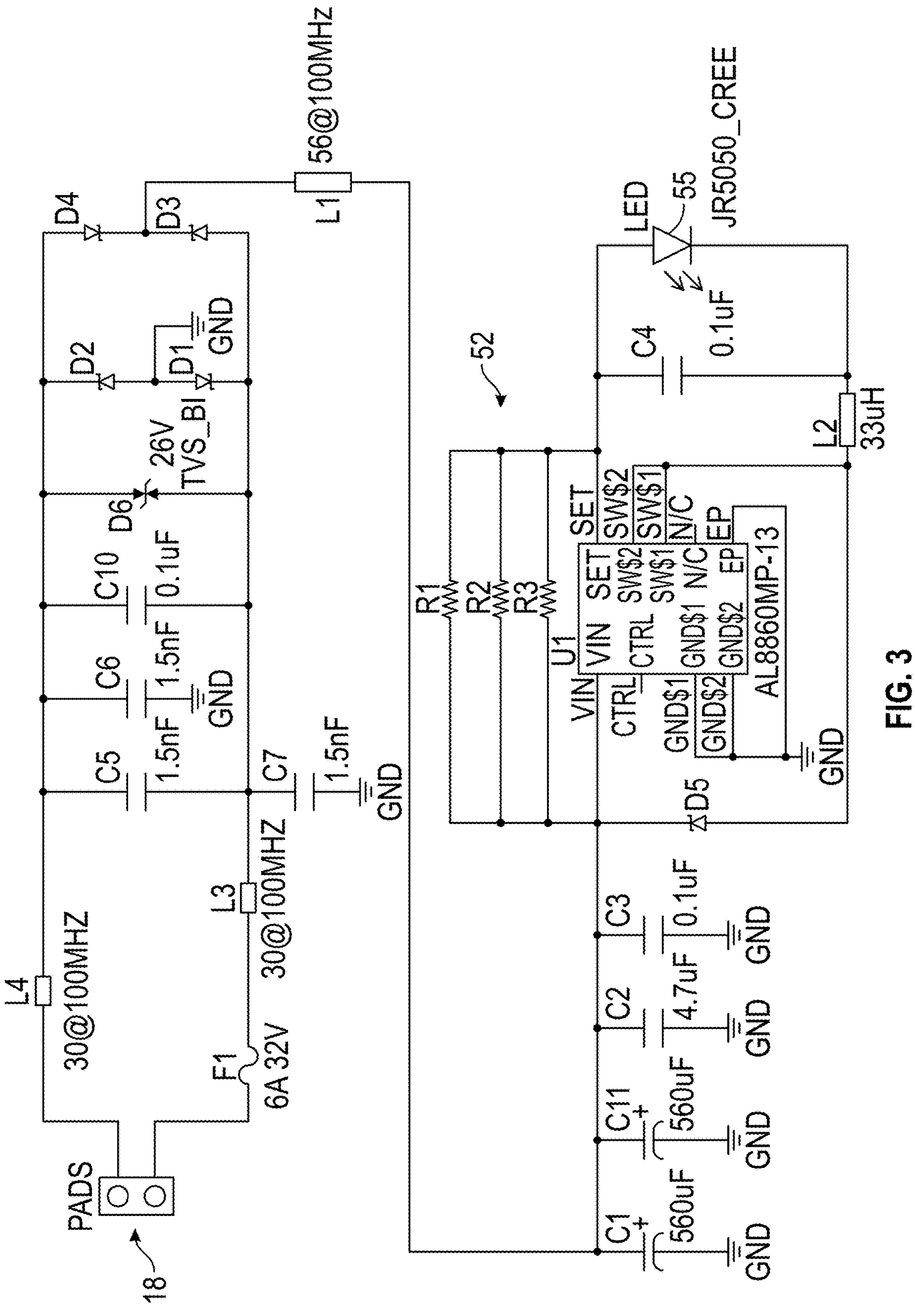
FIG. 3 is a schematic diagram of a circuit of one embodiment of the invention.

FIGS. 1-3 illustrate a lighting fixture 10 for supporting on a surface 15, such as a vertical fence or a ground surface, for example. The lighting fixture 10 comprises a housing 20 having a top end 28 and a lower end 22. The housing 20 defines an internal volume 24. The housing 20 can be made of materials such as aluminum, stainless steel, brass, plastic, composite materials, or the like. A housing shroud 30 is configured to mate with the top end 28 of the housing 20. Such a housing shroud 30 can be constructed from materials similar to the housing 20, or from transparent or translucent materials such as glass, acrylic, or polycarbonate, or the like.

The lighting fixture 10 includes an attachment mechanism 40 configured to secure the housing shroud 30 to the housing 20. Such an attachment mechanism 40 can be made of durable materials such as metal, high-strength plastics, or the like. The attachment mechanism 40 may comprise rotation channels 42 on one of the housing shroud 30 or the top end 28 of the housing 20 and corresponding rotation ramps 44 on the other of the housing shroud 30 or the top end 28 of the housing 20. Alternately screw threads (not shown) or a mechanical clamping mechanism (not shown) could be used to secure the housing 20 with the housing shroud 30.

A PCB assembly 50 comprising an integrated LED driver 52 and LED light source 55 (FIG. 3) is positioned within the internal volume 24. FIG. 3 illustrates one embodiment of a circuit of the PCB assembly 50. The PCB assembly 50 can be made of standard PCB materials such as FR-4, aluminum-backed PCB, or the like, and can comprise preferably a single layer PCB board, but could also include additional PCB boards (not shown) for separating the higher temperature LED light source 55 from the other components for heat minimization to the circuit, for example.

A first power connector 60 is fixed with the PCB assembly 50. A second power connector 70 is fixed with the housing 20 and configured to mate with the first power connector 60 to provide power from a power source 18 to the PCB assembly 50. The first power connector 60 may be a male barrel connector and the second power connector may be a cooperative female barrel connector, for example. These connectors 60, 70 can be made of conductive materials such as copper, brass, or gold-plated metals, or the like, as is known in the art.

An optic 90 is positioned above the PCB assembly 50 within the internal volume 24. The optic 90 can be made of materials such as acrylic, polycarbonate, glass, or the like. A lens 100 is positioned above the optic 90. Such a lens 100 can be made of similar materials to the optic 90.

At least one compression element 110 is configured to compress the components within the internal volume 24 of the housing 20 when the housing shroud 30 is secured to the housing 20, thereby ensuring contact for heat dissipation and water resistance. The at least one compression element 110 may include an elastomeric O-ring, resilient materials, springs, or the like. The compression element 110 can be made of elastomeric materials such as silicone, EPDM, neoprene, or the like, and each compression element 110 may be of a different durometer than other of the at least one compression elements 110.

A thermal pad 80 may be positioned between the PCB assembly 50 and the housing 20 within the internal volume 24. Such a thermal pad 80 can be made of thermally conductive materials such as silicone-based compounds, graphite, or the like.

Alternately, a thermal paste (not shown) may be used instead. The lens 100 may fit within the housing shroud 30 and be fixed between the at least one compression element 110 and a housing body compression surface 112. This configuration helps ensure a watertight seal and proper alignment of components.

The optic 90 may include spacers 92 for fixing a distance between the optic 90 and the LED light source 55 on the PCB assembly 50. Such spacers 92 can be made of materials such as plastic, silicone, or the like.

The optic 90 may have a compression surface 94 for a second compression element 114 to press against the lens 100. This additional second compression element 114 can be made of similar materials to the first compression element 110, but again, may be made with differing durometers to ensure that upon securing the housing shroud 30 to the housing 20, compression tension is transferred evenly throughout a stack of the components comprising the lens 100, the compression element 110, the second compression element 114, the optic 90, the spacers 92, and the PCB assembly 50.

The housing 20 may include a rotational leg assembly 120 at the lower end 22 that can terminate in a spike 122 that is inserted into, for example, a dirt or ground surface 15. Alternatively, the rotational leg assembly 120 at the lower end 22 may be designed for mounting on the surface 15, or being fixed with at least one mechanical fastener or bracket (not shown) to a vertical surface, a fence, a building structure, or the like. Such a rotational leg assembly 120 can be made of durable materials such as stainless steel, aluminum, reinforced plastics, or the like.

The rotational leg assembly 120 may include a rotational leg adjustment 124 that allows the direction of the light emanating from the lighting fixture 10 to be adjusted in angle relative to the surface 15. This adjustment mechanism can be made of materials similar to the rotational leg assembly 120.

The spacers 92 may include prongs 96 that are configured to mate with aligned apertures in the PCB assembly 50. This configuration helps ensure proper alignment and spacing of the optic 90 relative to the LED light source 55.

The power source 18 is preferably a low voltage transformer 130, or the like, wired to the lower end 22 of the housing 20 to the PCB assembly 50. Alternatively, the power source 18 may include a rechargeable battery 140 fixed within the housing 20 and electrically connected to the second power connector 70, or a remote rechargeable battery 140. At least one solar cell 142 may be electrically connected with the rechargeable battery 140 and configured to recharge the rechargeable battery 140 during daylight hours. The rechargeable battery 140 can be made of various battery chemistries such as lithium-ion, nickel-metal hydride, or the like, as is known in the art. The solar cell 142 can be made of materials such as monocrystalline silicon, polycrystalline silicon, thin-film technologies, or the like, as is known in the art.

The lighting fixture 10 described herein combines the performance of integrated LED lighting systems with the ease-of-use of non-integrated LED lighting systems. The driver 52 and LED light source 55 are combined into a single PCB assembly 50 that is integrated into the housing 20, the combination being engineered to maintain the performance standards of an integrated LED lighting system, while maintaining the interchangeable and/or replaceable functionality of the non-integrated LED lighting system.

Assembly steps begin with the thermal pad 80 placed with slots aligned to holes in the internal volume 24 at the lower end 22 of the housing 20. The PCB assembly 50 and first power connector 60, as a pre-assembled unit, is held by a top of the first power connector and placed into the housing 20 internal volume 24 to align with the pre-assembled second power connector 70, pressed in the power connectors are mated. The optic 90 is placed into the internal volume 24 of housing 20 with each spacer 92 and prong 96 aligned with aligned apertures 54 in the PCB assembly 50, ensuring all components below are correctly aligned. The compression element 110 is placed on the housing 20 compression surface 112. The second compression element 114 is placed on the outer circumference of optic 90, the compression surface 94. The lens 100 is placed on the first compression element 110 and the second compression element 114. The housing shroud is placed onto housing 20 and rotated as previously described.

Tool-less interchangeable and/or replaceable function can be achieved by rotating the housing shroud 30 in an opposing direction and removing it, as well as removing the lens 100, any compression elements, and the optic 90, then gripping the top of the first power connector 60 and lifting to remove the PCB assembly 50 and first power connector 60. The PCB assembly 50 may be replaced with a PCB assembly 50 having different lighting characteristics, such as different power outputs (such as low, medium, high, or extra high, for example). Different optics 90 may be utilized for different lighting effects, such as flood lighting to spot lighting, and the like.

While a particular form of the invention has been illustrated and described, it will be apparent that various modifications can be made without departing from the spirit and scope of the invention. For example, the housing 20 and the housing shroud 30 are shown as generally cylindrical in shape, but other shapes of the housing 20 and the housing shroud 30 could be utilized as desired. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A lighting fixture for supporting on a surface, the fixture comprising:

a housing having a top end and a lower end, the housing defining an internal volume;

a housing shroud configured to mate with the top end of the housing;

an attachment mechanism configured to secure the housing shroud to the housing;

a PCB assembly comprising an integrated LED driver and LED light source, the PCB assembly positioned within the internal volume;

a first power connector fixed with the PCB assembly;

a second power connector fixed with the housing and configured to mate with the first power connector to provide electrical power from a power source to the PCB assembly;

an optic positioned above the PCB assembly within the internal volume;

a lens positioned above the optic; and at least one compression element configured on an outer circumference of the optic configured to compress components within the internal volume of the housing when the housing shroud is secured to the housing, thereby ensuring contact for heat dissipation and water resistance.

2. The lighting fixture of claim 1 wherein the attachment mechanism comprises rotation channels on one of the housing shroud or the top end of the housing and corresponding rotation ramps on the other of the housing shroud or the top end of the housing.

3. The lighting fixture of claim 1 further including a thermal pad positioned between the PCB assembly and the housing within the internal volume.

4. The lighting fixture of claim 1, wherein the lens fits within the housing shroud and is fixed between the at least one compression element and a housing body compression surface.

5. The lighting fixture of claim 1, wherein the optic includes spacers for fixing a distance between the optic and the LED light source on the PCB assembly.

6. The lighting fixture of claim 1, wherein the optic has a compression surface for a second compression element to press against the lens.

7. The lighting fixture of claim 1, wherein the housing includes a rotational leg assembly at the lower end that can terminate in a spike that is inserted into the surface.

8. The lighting fixture of claim 1, wherein the housing includes a rotational leg assembly at the lower end for mounting with the surface.

9. The lighting fixture of claim 7, wherein the rotational leg assembly includes a rotational leg adjustment that allows a direction of the light emanating from the lighting fixture to be adjusted in angle relative to the surface.

10. The lighting fixture of claim 8, wherein the rotational leg assembly includes a rotational leg adjustment that allows a direction of the light emanating from the lighting fixture to be adjusted in angle relative to the surface.

11. The lighting fixture of claim 5, wherein the spacers include prongs that are configured to mate with aligned apertures in the PCB assembly.

12. The lighting fixture of claim 1, wherein the first power connector is a male barrel connector and the second power connector is a cooperative female barrel connector.

13. The lighting fixture of claim 1, wherein the power source is a low voltage transformer wired to the lower end of the housing.

14. The lighting fixture of claim 1, wherein the power source is a rechargeable battery fixed within the housing and electrically connected to the second power connector, and at least one solar cell electrically connected with the rechargeable battery and configured to recharge the rechargeable battery during daylight hours.

15. The lighting fixture of claim 1, wherein the at least one compression element is an elastomeric O-ring.

16. A lighting fixture for supporting on a surface, the fixture comprising:

a housing having a top end and a lower end, the housing defining an internal volume;

a housing shroud configured to mate with the top end of the housing;

an attachment mechanism comprising rotation channels on one of the housing shroud or the top end of the housing and corresponding rotation ramps on the other of the housing shroud or the top end of the housing, wherein the attachment mechanism is configured to secure the housing shroud to the housing;

a PCB assembly comprising an integrated LED driver and LED light source, the PCB assembly positioned within the internal volume;

a first power connector fixed with the PCB assembly, wherein the first power connector is a male barrel connector;

a second power connector fixed with the housing and configured to mate with the first power connector to provide power from a power source to the PCB assembly, wherein the second power connector is a cooperative female barrel connector;

a thermal pad positioned between the PCB assembly and the housing within the internal volume;

an optic positioned above the PCB assembly within the internal volume, wherein the optic includes spacers for fixing a distance between the optic and the LED light source on the PCB assembly, and wherein the spacers include prongs that are configured to mate with aligned apertures in the PCB assembly;

a lens positioned above the optic;

at least one compression element configured to compress components within the internal volume of the housing when the housing shroud is secured to the housing, thereby ensuring contact for heat dissipation and water resistance, wherein the at least one compression element is an elastomeric O-ring;

wherein the lens fits within the housing shroud and is fixed between the at least one compression element and a housing body compression surface;

wherein the optic has a compression surface for a second compression element to press against the lens;

wherein the housing includes a rotational leg assembly at the lower end that can terminate in a spike that is inserted into the surface; and wherein the rotational leg assembly includes a rotational leg adjustment that allows a direction of the light emanating from the lighting fixture to be adjusted in angle relative to the surface.

17. A method of assembling a lighting fixture, comprising:

placing a thermal pad with slots aligned to holes in an internal volume at a lower end of a housing;

inserting a pre-assembled PCB assembly with an integrated LED driver, LED light source, and first power connector into the internal volume of the housing;

aligning the first power connector with a pre-assembled second power connector assembly in the housing and mating the connectors;

positioning an optic into the internal volume of the housing, aligning spacers and a compression surface of the optic with apertures in the PCB assembly;

placing a first compression element on an outer circumference of the optic;

positioning a second compression element on a compression surface of the housing;

placing a lens on the second compression element;

positioning a housing shroud onto the housing; and rotating the housing shroud to secure it to the housing, thereby compressing the internal components.

* * * * *